(12) United States Patent
Walsdorff et al.

(10) Patent No.: US 6,863,877 B2
(45) Date of Patent: Mar. 8, 2005

(54) IRON OXIDES OF REDUCED CHLORIDE CONTENT

(75) Inventors: Christian Walsdorff, Ludwigshafen (DE); Hermann Petersen, Grünstadt (DE); Klaus Harth, Altleiningen (DE); Michael Baier, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 279 days.

(21) Appl. No.: 09/905,899

(22) Filed: Jul. 17, 2001

(65) Prior Publication Data

US 2002/0034469 A1 Mar. 21, 2002

(30) Foreign Application Priority Data

Jul. 31, 2000 (DE) .......................................... 100 37 636
Sep. 20, 2000 (DE) .......................................... 100 46 876

(51) Int. Cl.⁷ .............................................. C01G 49/02
(52) U.S. Cl. ........................ 423/632; 423/633; 423/634; 423/150.1
(58) Field of Search ................................ 423/632, 633, 423/634, 146, DIG. 1, 481, 488, 390.1, 150.1

(56) References Cited

U.S. PATENT DOCUMENTS

| 1,837,709 A | * | 12/1931 | Heckman ..................... 106/456 |
| 5,401,485 A | * | 3/1995 | Hamilton, Jr. ............... 423/632 |
| 5,597,547 A | * | 1/1997 | Hamilton, Jr. ............... 423/632 |

FOREIGN PATENT DOCUMENTS

| CA | 2020306 | 1/1991 |
| EP | 0 406 633 | 1/1991 |
| EP | 1 027 928 | 8/2000 |
| WO | WO 95/25069 | 9/1995 |
| WO | WO 96/32355 | 10/1996 |

OTHER PUBLICATIONS

Handbook of Chemistry and Physics, 52nd ed., 1971–1972, p. D–222.*

* cited by examiner

Primary Examiner—Ngoc-Yen Nguyen
(74) Attorney, Agent, or Firm—Keil & Weinkauf

(57) ABSTRACT

A process for removing chloride from chloridic iron oxide comprises mixing said chloridic iron oxide with an acid and subsequently conducting a thermal treatment at from 50 to 1300° C.

12 Claims, No Drawings

IRON OXIDES OF REDUCED CHLORIDE CONTENT

The present invention relates to a process for removing chloride from chloridic iron oxide, which comprises mixing said chloridic iron oxide with an acid and subsequently subjecting the mixture to a thermal treatment at elevated temperatures.

Iron oxides containing residual chloride are generated in some industrial processes. An important example is the work-up of hydrochloric acid waste liquids generated from steel pickling wherein the hydrochloric acid pickling waste, which contains iron chloride, is sprayed into a roaster where it is reacted with oxygen to form mainly $Fe_2O_3$ (hematite) and hydrogen chloride. This process generally leaves an appreciable fraction of residual chloride in the iron oxide. The residual chloride content of such iron oxides is typically in the range from 800 to 3000 ppm. The chloride content of iron oxides of this type leaves something to be desired for industrial applications.

WO-A-96/32355 discloses a process for reducing the chloride content of such iron oxides by mixing the chloride-containing iron oxide with a hydrated metal compound and water and a subsequent calcination. The use of a hydrated metal compound makes the process costly and inconvenient.

It is an object of the present invention to remedy this disadvantage.

We have found that this object is achieved by a novel and improved process for removing chloride from chloridic iron oxide, which comprises mixing said chloridic iron oxide with an acid and subsequently conducting a thermal treatment at from 50 to 1300° C.

The process of the invention can be carried out as follows:

The chloridic iron oxide may be mixed with an acid and then subjected to a thermal treatment at from 100 to 1300° C.

Useful chloridic iron oxides include in particular those which are produced by spray roasting hydrochloric acid pickling wastes in the steel industry and are present as $Fe_2O_3$ (hematite) having a residual chloride content in the range from 800 to 20,000 ppm, preferably in the range from 800 to 5000 ppm, particularly preferably in the range from 800 to 2000 ppm. The iron oxide used may also include other impurities. Such impurities, which are frequently present in technical grade iron oxides, include for example compounds of titanium, manganese, aluminum, chromium, phosphorus, zinc, copper, molybdenum, silicon, nickel, magnesium, potassium, sodium, cobalt, niobium, sulfur and/or calcium.

Useful acids include organic acids and inorganic acids, in pure or dilute form, except acids that contain Cl in the acid molecule. Useful acids include for example carboxylic acids, preferably $C_1$- to $C_{20}$-carboxylic acids, particularly preferably $C_1$- to $C_8$-alkylcarboxylic acids, especially $C_1$- to $C_4$-alkylcarboxylic acid such as formic acid and acetic acid, preferably inorganic acids such as mineral acids, except acids that contain Cl in the acid molecule, for example nitric acid, nitrous acid, phosphoric acid, phosphorous acid, sulfuric acid or sulfurous acid, preferably dilute (aqueous) 0.1–50% by weight, preferably 0.2–25% by weight, particularly preferably 0.5–15% by weight acids, particularly preferably dilute acids which are decomposable or completely removable in the course of the thermal treatment. Very particular preference is given to using dilute 0.5–50% by weight, preferably 0.5–25% by weight, particularly preferably 0.5–15% by weight, nitric acid.

The iron oxide may be mixed with the acid to form a liquid suspension, preferably a moist mass, in which case typically all customary mixing means, preferably mixers, kneaders or mullers are used. To prepare a moist mass of iron oxide and an acid, it is typical to use from 10 to 3000 ml, preferably from 50 to 2000 ml, particularly preferably from 100 to 1500 ml, especially from 400 to 1200 ml, of an optionally aqueous dilute acid per kilogram of iron oxide. The mixing may be carried out discontinuously, batchwise, semicontinuously or continuously.

After mixing, the mixture may be left to stand for some time or be thermally treated directly. To thermally treat the mixture, it may be treated discontinuously, batchwise, semicontinuously or continuously at a single temperature or at different temperatures. The thermal treatment may generally be carried out at from 50 to 1300° C. The thermal treatment generally comprises a drying step at from 50 to 300° C., preferably from 80 to 200° C., particularly preferably from 90 to 180° C., and a calcining step at from 450 to 1300° C., preferably from 550 to 1200° C., particularly preferably from 600 to 1100° C. A particularly preferred embodiment comprises a calcining step at from 650 to 750° C. and a subsequent calcining step at from 850 to 1000° C. It is also possible to calcine directly at from 850 to 1000° C. without prior calcination at from 650 to 750° C.

The reduced residual chloride content iron oxide treated according to the invention generally has a residual chloride content of from 10 to 800 ppm, preferably from 15 to 700 ppm, particularly preferably from 20 to 250 ppm, especially from 25 to 150 ppm, and generally has a, hematite structure and is useful for a whole series of industrial applications such as pharmaceuticals, cosmetics, magnetic tape coatings, chemical reactions, catalysts, especially to produce catalysts for dehydrogenating ethylbenzene to styrene.

EXAMPLES

All examples were carried out using the HP (Hösch Premium) iron oxide from Thyssen-Krupp. The residual chloride content was in all cases determined coulometrically. The untreated HP iron oxide had a residual chloride content of 1400 ppm. All values are compared in Table 1.

Example 1

200 g of the iron oxide were mixed with 125 ml of 1% $HNO_3$. The mixture was then left to stand at room temperature for one hour, dried at 120° C. for 16 h and calcined at 700° C. for 1 h.

Example 2

Example 1 was repeated using 125 ml of 5% $HNO_3$.

Example 3

Example 1 was repeated using 125 ml of 10% $HNO_3$.

Example 4

Example 1 was repeated except that the mixture from the calcination at 700° C. was further calcined at 900° C. for one hour.

Example 5

Example 4 was repeated using 125 ml of 5% $HNO_3$.

Example 6

Example 4 was repeated using 125 ml of 10% $HNO_3$.

TABLE 1

Chloride content of untreated iron oxide and of iron oxides treated according to the invention.

| Iron oxide | Residual chloride [ppm] |
| --- | --- |
| Untreated HP (Thyssen-Krupp) | 1400 |
| Example 1 (1% $HNO_3$/700° C.) | 680 |
| Example 2 (5% $HNO_3$/700° C.) | 610 |
| Example 3 (10% $HNO_3$/700° C.) | 570 |
| Example 4 (1% $HNO_3$/900° C.) | 86 |
| Example 5 (5% $HNO_3$/900° C.) | 60 |
| Example 6 (10% $HNO_3$/900° C.) | 64 |

We claim:

1. A process for removing chloride from chloridic iron oxide, which comprises mixing said chloridic iron oxide with nitric acid and subsequently conducting a calcining step at from 850 to 1300° C.

2. A process as claimed in claim 1, wherein said chloridic iron oxide is dried at from 50 to 300° C. and subsequently calcined.

3. A process as claimed in claim 1, wherein said calcining step is conducted at from 850 to 1000° C.

4. A process as claimed in claim 1, wherein said acid is dilute, aqueous and from 0.1 to 50% by weight in strength.

5. A process as claimed in claim 1, wherein said acid is dilute, aqueous 0.5–15% by weight nitric acid.

6. A process as claimed in claim 1, wherein said chloridic iron oxide is produced by spray roasting hydrochloric acid waste liquids generated from steel pickling.

7. An iron oxide prepared by the process defined in claim 1 and having a residual chloride content of from 10 to 800 ppm.

8. The process of claim 1, which comprises conducting a precalcining step at from 650 to 750° C. and subsequently conducting the calcining step at from 850 to 1300° C.

9. The process of claim 3, wherein said chloridic iron oxide is dried at from 50 to 300° C. and subsequently calcined.

10. The process of claim 3, which comprises conducting a precalcining step at from 650 to 750° C. and subsequently conducting the calcining step at from 850 to 1000° C.

11. The process of claim 1, wherein the acid is employed in an amount of from 10 ml to 3000 ml per kilogram of said chloridic iron oxide.

12. The iron oxide defined in claim 7, wherein the residual chloride content is from 10 to 250 ppm.

* * * * *